United States Patent
Hayashi

(10) Patent No.: US 9,753,668 B2
(45) Date of Patent: Sep. 5, 2017

(54) METHOD AND APPARATUS TO MANAGE TIER INFORMATION

(71) Applicant: Hitachi, Ltd., Tokyo (JP)

(72) Inventor: Shinichi Hayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 14/169,674

(22) Filed: Jan. 31, 2014

(65) Prior Publication Data

US 2014/0149707 A1    May 29, 2014

Related U.S. Application Data

(63) Continuation of application No. 12/762,542, filed on Apr. 19, 2010, now Pat. No. 8,677,093.

(51) Int. Cl.
*G06F 3/06* (2006.01)

(52) U.S. Cl.
CPC .......... *G06F 3/0647* (2013.01); *G06F 3/0604* (2013.01); *G06F 3/0611* (2013.01); *G06F 3/0683* (2013.01); *G06F 3/0685* (2013.01)

(58) Field of Classification Search
CPC .... G06F 3/0647; G06F 3/0604; G06F 3/0683; G06F 3/0685; G06F 3/0611
See application file for complete search history.

(56) References Cited

U.S. PATENT DOCUMENTS

| | | |
|---|---|---|
| 6,032,224 A | 2/2000 | Blumenau |
| 7,441,096 B2 * | 10/2008 | Kitamura ............. 711/203 |
| 2002/0091746 A1 | 7/2002 | Umberger et al. |
| 2002/0188592 A1 | 12/2002 | Leonhardt et al. |
| 2006/0010154 A1 * | 1/2006 | Prahlad et al. ............ 707/102 |
| 2006/0010169 A1 | 1/2006 | Kitamura |
| 2006/0195659 A1 | 8/2006 | Kano |
| 2007/0055713 A1 | 3/2007 | Nagai et al. |
| 2008/0091898 A1 | 4/2008 | Takahashi et al. |
| 2008/0177947 A1 | 7/2008 | Eguchi et al. |
| 2008/0301763 A1 | 12/2008 | Sasaki et al. |
| 2010/0077168 A1 | 3/2010 | Arakawa |

FOREIGN PATENT DOCUMENTS

WO     2008/007348 A1     1/2008

\* cited by examiner

*Primary Examiner* — Michael Alsip
(74) *Attorney, Agent, or Firm* — Mattingly & Malur, PC

(57) ABSTRACT

A method of tier management of data comprises performing a tier migration log information setup process which includes selecting an area specified by a virtual volume address and a logical volume address; determining a destination tier for the area based on a number of accesses to the area; and updating a tier migration log information by inputting the determined destination tier and a time; and performing a process using the tier migration log information to determine whether to migrate a specific area which includes loading a tier migration log from the tier migration log information by selecting a specific time; checking if a current tier of the specific area equals a destination tier specified by the tier migration log; and if the current tier is not equal to the destination tier, migrating the specific area to the destination tier.

17 Claims, 10 Drawing Sheets

222

RAID GROUP INFORMATION

| RAID GROUP NAME (301) | MEDIA NAME (302) | MEDIA TYPE (303) | RAID LEVEL (304) |
|---|---|---|---|
| RG A | SSD A, SSD B, SSD C, SSD D | SSD | RAID 10 (2D+2D) | 305 |
| RG B | HDD A, HDD B, HDD C, HDD D | SAS HDD | RAID 5 (3D+1P) | 306 |
| RG C | HDD E, HDD F, HDD G, HDD H | SATA HDD | RAID 5 (3D+1P) | 307 |
| : | : | : | : |

223

LOGICAL VOLUME INFORMATION

| LOGICAL VOLUME NAME (321) | LOGICAL VOLUME ADDRESS (322) | MEDIA TYPE (323) | RAID GROUP NAME (324) | RAID GROUP ADDRESS (325) |
|---|---|---|---|---|
| L-VOL A | 0 - 199 | SSD | RG A | 0 - 199 | 326 |
| L-VOL B | 0 - 199 | SAS HDD | RG B | 0 - 199 | 327 |
| L-VOL C | 0 - 1999 | SATA HDD | RG C | 0 - 1999 | 328 |
| L-VOL D | 0 - 1999 | SATA HDD | RG D | 0 - 1999 | 329 |
| : | : | : | : | : |

224

POOL INFORMATION

| POOL NAME (341) | LOGICAL VOLUME NAME (342) | VIRTUAL VOLUME NAME (343) |
|---|---|---|
| POOL A | L-VOL A, L-VOL B, L-VOL C | V-VOL A | 344 |
| POOL B | L-VOL D, L-VOL E | V-VOL B, V-VOL C | 345 |
| : | : | : |

VIRTUAL VOLUME INFORMATION

| VIRTUAL VOLUME NAME | VIRTUAL VOLUME ADDRESS | LOGICAL VOLUME NAME | LOGICAL VOLUME ADDRESS | NUMBER OF ACCESS | ACCESS PER CAPACITY |
|---|---|---|---|---|---|
| V-VOL A | 0 - 99 | L-VOL A | 0 - 99 | 11000 | 110 |
| V-VOL A | 100 - 149 | L-VOL A | 100 - 149 | 3000 | 60 |
| V-VOL A | 150 - 199 | L-VOL B | 0 - 49 | 5000 | 100 |
| V-VOL A | 200 - 299 | L-VOL B | 50 - 149 | 5000 | 20 |
| V-VOL A | 300 - 399 | L-VOL C | 0 - 99 | 2000 | 50 |
| V-VOL A | 400 - 449 | L-VOL C | 100 - 149 | 500 | 10 |
| V-VOL B | 0 - 199 | L-VOL D | 0 - 199 | 1000 | 10 |
| : | : | : | : | : | : |

401, 402, 403, 404, 405, 406, 407, 408, 409, 410, 411, 412, 413

226

TIER AND MEDIA DEFINITION INFORMATION

| TIER | MEDIA TYPE | CAPACITY THRESHOLD | DEFAULT TIER |
|---|---|---|---|
| 0 | SSD | 80% | |
| 1 | SAS HDD | 90% | |
| 2 | SATA HDD | 100% | X |
| : | : | : | : |

TIER DESTINATION INFORMATION

| VIRTUAL VOLUME NAME | VIRTUAL VOLUME ADDRESS | CAPAC-ITY | NUMBER OF ACCESS | ACCESS PER CAPACITY | CUR-RENT TIER | DESTI-NATION TIER | |
|---|---|---|---|---|---|---|---|
| V-VOL A | 0 - 99 | 100 | 11000 | 110 | 0 | 0 | 508 |
| V-VOL A | 150 - 199 | 50 | 5000 | 100 | 1 | 0 | 509 |
| V-VOL A | 100 - 149 | 50 | 3000 | 60 | 0 | 1 | 510 |
| V-VOL A | 300 - 399 | 100 | 2000 | 50 | 2 | 1 | 511 |
| V-VOL A | 200 - 299 | 100 | 5000 | 20 | 1 | 2 | 512 |
| V-VOL A | 400 - 449 | 50 | 500 | 10 | 2 | 2 | 513 |
| : | : | : | : | : | : | : | |

228

TIER MIGRATION LOG INFORMATION

| LOG ID | DATE AND TIME | IOPS | |
|---|---|---|---|
| 5 | 02/16/2010 06:03 PM | 7 | 524 |

| VIRTUAL VOLUME NAME | VIRTUAL VOLUME ADDRESS | TIER | |
|---|---|---|---|
| V-VOL A | 0 - 99 | 0 | 544 |
| V-VOL A | 100 - 149 | 0 | 545 |
| V-VOL A | 150 - 199 | 1 | 546 |
| V-VOL A | 300 - 399 | 1 | 547 |
| : | : | : | |

Fig. 5

TIER MANAGEMENT SCREEN 600

| TIER | MEDIA TYPE | CAPACITY THRESHOLD | DEFAULT TIER | |
|---|---|---|---|---|
| 0 | SSD | 70% | ○ | 605 |
| 1 | SAS HDD | 80% | ○ | 606 |
| 2 | SATA HDD | 90% | ⦿ | 607 |
| | | | ○ | |
| | | | ○ | |

Columns: 601 TIER, 602 MEDIA TYPE, 603 CAPACITY THRESHOLD, 604 DEFAULT TIER

607 OK

RESTORE POINT SELECTION SCREEN 620

| RESTORE POINT | DATE AND TIME | IOPS | |
|---|---|---|---|
| ⦿ | 02/16/2010 06:03 PM | 7 | 624 |
| ○ | 02/17/2010 03:10 PM | 4 | 625 |
| ○ | 02/18/2010 03:10 AM | 3 | 626 |
| ○ | 02/18/2010 05:45 PM | 3 | 627 |
| ○ | 02/19/2010 10:33 PM | 6 | 628 |

Columns: 621 RESTORE POINT, 622 DATE AND TIME, 623 IOPS

629 RESTORE

Fig. 6

700 READ COMMAND

| COMMAND TYPE (701) | VOLUME NAME (702) | VOLUME ADDRESS (703) |
| --- | --- | --- |
| READ | V-VOL A | 10 - 19 |

720 WRITE COMMAND

| COMMAND TYPE (721) | VOLUME NAME (722) | VOLUME ADDRESS (723) | DATA (724) |
| --- | --- | --- | --- |
| WRITE | V-VOL A | 500 - 503 | ABCD |

METHOD AND APPARATUS TO MANAGE TIER INFORMATION

This application is a continuation of U.S. patent application Ser. No. 12/762,542, filed on Apr. 19, 2010, the entire disclosure of which is incorporated herein by reference.

BACKGROUND OF THE INVENTION

The present invention relates generally to thin provisioning and tier management and, more particularly, to a method and an apparatus to save and restore tier information.

In recent years, thin provisioning has become popular. Thin provisioning is a method for allocating area for a storage subsystem that receives a write command to unallocated area. Currently, a storage subsystem migrates frequently accessed allocated area to fast and expensive media and migrates rarely accessed allocated area to slow and cheap media. As such, an area accessed by a program that runs only at specified times is not accessed and is moved to slow media when the program does not run. However, a problem with performance will occur when the program starts.

BRIEF SUMMARY OF THE INVENTION

Exemplary embodiments of the invention provide a method and an apparatus to save and restore tier information. In a specific embodiment, the storage subsystem records tier migration log information. The tier migration log includes the relationship between area and tier when the area is moved to a different tier. The storage subsystem moves the area to the original tier using the tier migration log information to restore the tier when the job starts.

An aspect of the present invention is directed to a method of tier management of data, in a system which includes a host, a network, and a storage system coupled to the host via the network, the storage system having a memory, a plurality of virtual volumes, a plurality of logical volumes, and a plurality of physical media. The method comprises performing a tier migration log information setup process which includes selecting an area specified by a virtual volume address and a logical volume address; determining a destination tier for the area based on a number of accesses to the area; and updating a tier migration log information by inputting the determined destination tier and a time; and performing a process using the tier migration log information to determine whether to migrate a specific area which includes loading a tier migration log from the tier migration log information by selecting a specific time; checking if a current tier of the specific area equals a destination tier specified by the tier migration log; and if the current tier is not equal to the destination tier, migrating the specific area to the destination tier.

In some embodiments, the method further comprises keeping the specific area in the current tier if the current tier is equal to the destination tier. The method further comprises storing logical volume information of the logical volumes, which includes logical volume name, logical volume address, media type, RAID group name, and RAID group address. The method further comprises storing virtual volume information of the logical volumes, which includes virtual volume name, virtual volume address, logical volume name, logical volume address, number of access, and access capacity. The method further comprises storing tier and media definition information, which includes tier, media type, and capacity threshold; wherein the current tier of the specific area is determined from the virtual volume information, the logical volume information, and the tier and media definition information. The destination tier is determined with reference to the virtual volume information and the tier and media definition information. A logical volume capacity is calculated from the logical volume address and the capacity threshold from the tier and media definition information; and the destination tier for the area is determined based on the number of accesses to the area and the logical volume capacity. The method further comprises storing tier destination information which includes virtual volume name, virtual volume address, capacity, number of access, access per capacity, current tier, and destination tier, that are organized in a descending order of access per capacity, wherein the tier destination information is created based on the virtual volume information and the media type from the logical volume information.

In specific embodiments, the tier migration log information includes log ID, time, and performance corresponding to the log ID and time, and further includes virtual volume name, virtual volume address, and tier corresponding to the virtual volume name and virtual volume address. The method further comprises, after one of a read access or a write access to an area, updating the number of access to the area. The tier migration log information is updated by inputting the determined destination tier and the time, and performance of access for the area. The performance of access is measured in one of IOPS (Input Output Operations Per Second) or BPS (Bits Per Second).

In accordance with another aspect of the invention, a storage system of tier management of data is coupled with a host via a network and it comprises a processor; a memory; a plurality of virtual volumes; a plurality of logical volumes; a plurality of physical media; and a tier control module. The tier control module is configured to set up tier migration log information, which includes selecting an area specified by a virtual volume address and a logical volume address; determining a destination tier for the area based on a number of accesses to the area; and updating a tier migration log information by inputting the determined destination tier and a time. The tier control module is configured to determine whether to migrate a specific area using the tier migration log information, which includes loading a tier migration log from the tier migration log information by selecting a specific time; checking if a current tier of the specific area equals a destination tier specified by the tier migration log; and if the current tier is not equal to the destination tier, migrating the specific area to the destination tier.

Another aspect of this invention is directed to an interface for tier management of data by performing a tier migration log information setup process which includes selecting an area specified by a virtual volume address and a logical volume address, determining a destination tier for the area based on a number of accesses to the area, and updating a tier migration log information by inputting the determined destination tier and a time and performance of access for the area; and performing a process using the tier migration log information to determine whether to migrate a specific area which includes loading a tier migration log from the tier migration log information by selecting a specific time, checking if a current tier of the specific area equals a destination tier specified by the tier migration log, and if the current tier is not equal to the destination tier, migrating the specific area to the destination tier, wherein the current tier of the specific area is determined from tier and media definition information. The interface comprises computer readable program code devices for receiving, from a user, the tier and media definition information which includes tier, media type, capacity threshold, and default tier; displaying the received tier and media definition information on a tier management screen; and displaying an OK button for the user to activate to update the tier and media definition information displayed on the tier management screen.

In specific embodiments, the interface further comprises computer readable program code devices for displaying a restore point selection screen including a plurality of restore points each having a time and a performance of access for an area for a user to select one of the restore points with a time corresponding to the specific time; and displaying a RESTORE button for the user to activate to restore the selected restore point.

These and other features and advantages of the present invention will become apparent to those of ordinary skill in the art in view of the following detailed description of the specific embodiments.

BRIEF DESCRIPTION OF THE DRAWINGS

FIG. 3 shows an example of the RAID group information, the logical volume information, and the pool information.

FIG. 4 shows an example of the virtual volume information and the tier and media definition information.

FIG. 5 shows an example of the tier destination information and the tier migration log information.

FIG. 6 shows an example of a tier management screen and a restore point selection screen.

FIG. 7 shows an example of a read command and a write command.

DETAILED DESCRIPTION OF THE INVENTION

Figure 1:
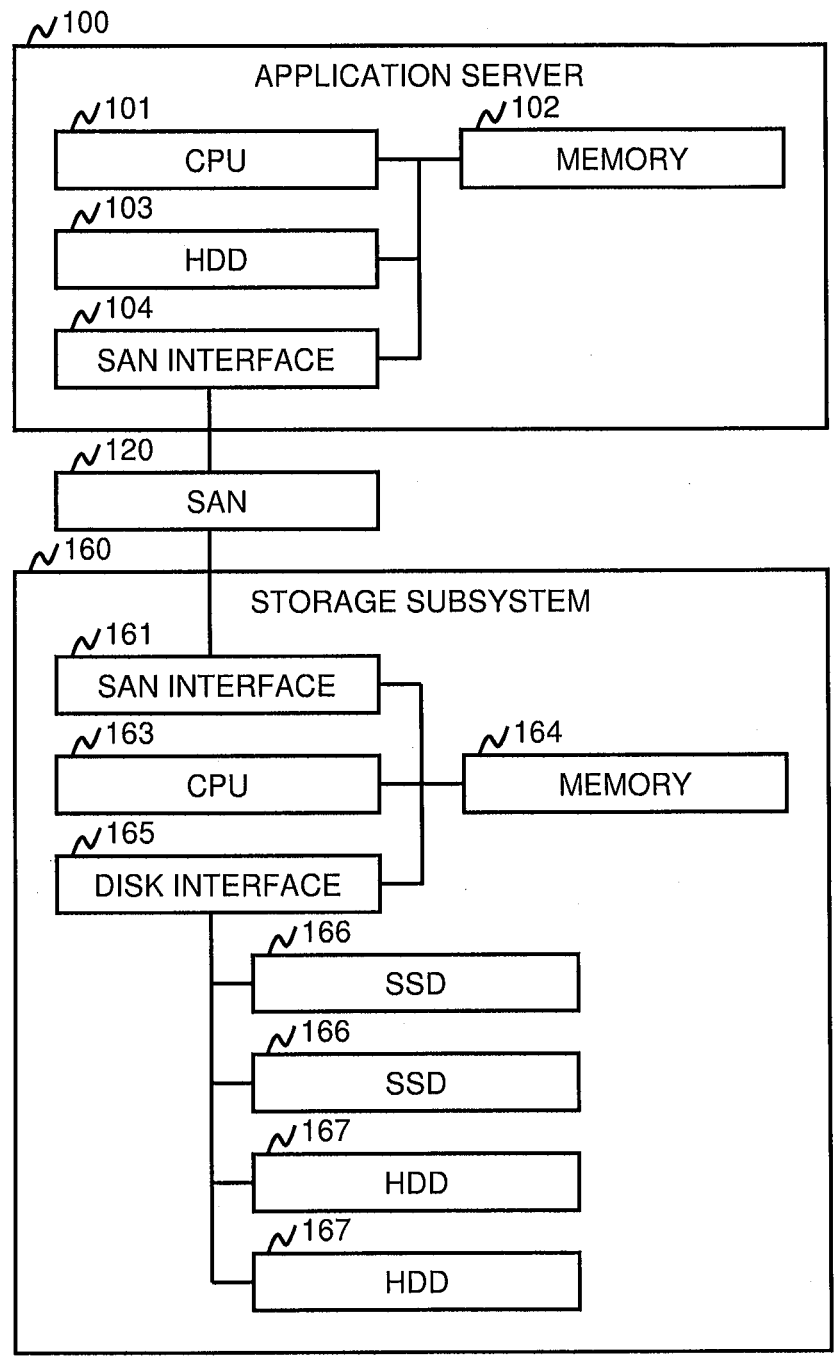
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for saving and restoring tier information in the thin provisioning context.

System Configuration

FIG. 1 illustrates an example of a hardware configuration of an information system in which the method and apparatus of the invention may be applied. The system comprises an application server 100, a SAN (Storage Area Network) 120, a LAN (Local Area Network) 140, and a storage subsystem 160. The application server 100 comprises a CPU (Central Processing Unit) 101, a memory 102, a HDD (Hard Disk Drive) 103, a SAN interface 104, and a LAN interface 105.

The CPU 101 reads programs from the memory 102 and executes the programs. The memory 102 reads programs and data from the HDD 103 when the application server 100 starts and stores the programs and the data. The HDD 103 stores programs and data. The SAN interface 104 connects the application server 100 and the SAN 120. The SAN 120 connects the application server 100 and the storage subsystem 160. The application server 100 uses the SAN 120 to send application data to the storage subsystem 160 and receive application data from the storage subsystem 160.

The storage subsystem 160 comprises a SAN interface 161, a CPU 163, a memory 164, a disk interface 165, a SSD (Solid State Drive) 166, and a HDD 167. The SAN interface 161 connects the storage subsystem 160 and the SAN 120. The CPU 163 reads programs from the memory 164 and executes the programs. The memory 164 reads programs and data from the HDD 167 and SSD 166 when the storage subsystem 160 starts and stores the programs and the data. The disk interface 165 connects the storage subsystem 160, the SSD 166, and the HDD 167. The SSD 166 stores programs and data. The HDD 167 stores programs and data.

Figure 2:
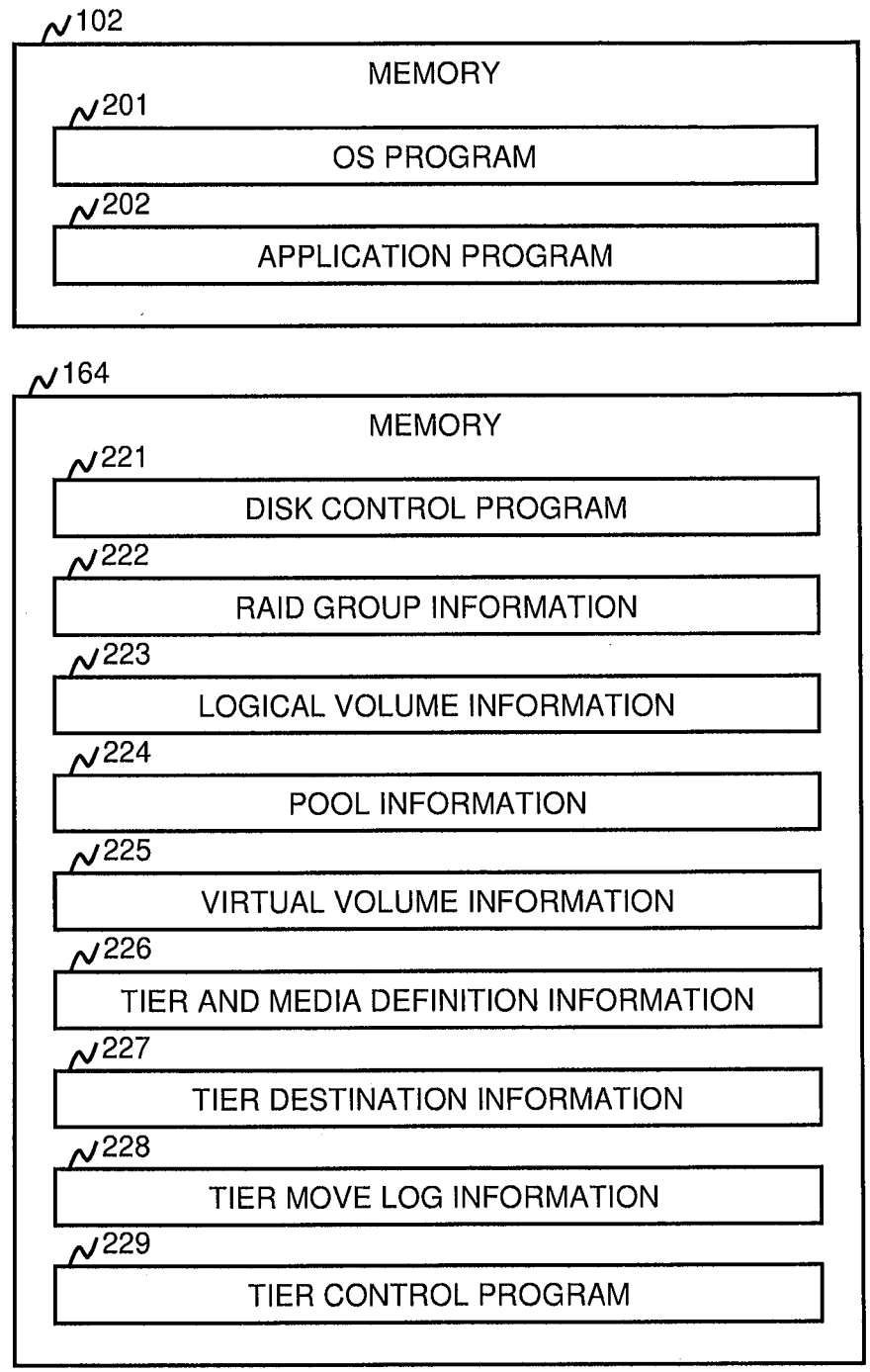
FIG. 2 illustrates an example of the memory in the application server of FIG. 1 and the memory in the storage subsystem of FIG. 1.

FIG. 2 illustrates an example of the memory 102 in the application server of FIG. 1 and the memory 164 in the storage subsystem 160 of FIG. 1 according to this embodiment.

The memory 102 comprises an OS (Operating System) program 201 and an application program 202. The OS program 201 executes the application program 202. The application program 202 (e.g., database program) reads data from the storage subsystem 160, processes data, and writes the results to the storage subsystem 160.

The memory 164 comprises a disk control program 221, RAID (Redundant Arrays of Inexpensive (or Independent) Disks) group information 222, logical volume information 223, pool information 224, virtual volume information 225, tier and media definition information 226, tier destination information 227, tier migration log information 228, and tier control program 229.

The disk control program 221 receives a read command and a write command from the application server 100, reads data from the SSD 166 and the HDD 167, and writes data to the SSD 166 and the HDD 167 using the RAID group information 222, the logical volume information 223, the pool information 224, the virtual volume information 225, and the tier and media definition information 226. The tier control program 229 calculates tier destination information 227 using the logical volume information 223, moves an area to different tiers using tier destination information 227, and records tier migration log information 228.

FIG. 3 shows an example of the RAID group information 222, the logical volume information 223, and the pool information 224.

The RAID group information 222 includes columns of a RAID group name 301, a media name 302, a media type 303, and a RAID level 304. For example, the row 305 shows that "RG A" has "SSD A," "SSD B," "SSD C," and "SSD D," the media type of "RG A" is "SSD," and the RAID level of "RG A" is "RAID 10 (2D+2D)."

The logical volume information 223 includes columns of a logical volume name 321, a logical volume address 322, a media type 323, a RAID group name 324, and a RAID group address 325. For example, the row 326 shows that the media type of "L-VOL A" is "SSD" and "L-VOL A" is allocated to the address from "0" to "199" in "RG A."

The pool information 224 includes columns of a pool name 341, a logical volume name 342, and a virtual volume name 343. For example, the row 344 shows "POOL A" has "L-VOL A," "L-VOL B," and "L-VOL C," and the area of "POOL A" is used by "V-VOL A."

FIG. 4 shows an example of the virtual volume information 225 and the tier and media definition information 226.

The virtual volume information 225 includes columns of a virtual volume name 401, a virtual volume address 402, a logical volume name 403, a logical volume address 404, a number of access 405, and an access per capacity 406. For example, the row 407 shows that the address from "0" to "99" in "V-VOL A" is allocated to the address from "0" to "99" in "L-VOL A," the number of access of the address from "0" to "99" in "V-VOL A" is "11000," and the access per capacity of the address from "0" to "99" in "V-VOL A" is "110."

The tier and media definition information 226 includes columns of a tier 421, a media type 422, a capacity threshold 423, and a default tier 424. The capacity threshold 423 is a maximum capacity rate that the media of the media type 422 is allocated to a virtual volume. For example, the row 425 shows an object defined such that tier being "0" in the object and tier definition information 226 is allocated to "SSD" media, "80%" area of a logical volume for which the media type is "SSD" is allocated to a virtual volume, and tier "0" is not the default tier.

FIG. 5 shows an example of the tier destination information 227 and the tier migration log information 228.

The tier destination information 227 includes columns of a virtual volume name 501, a virtual volume address 502, a capacity 503, a number of access 504, a access per capacity 505, a current tier 506, and a destination tier 507. For example, the row 508 shows that the capacity of the address from "0" to "99" in "V-VOL A" is "100," the number of access of the address from "0" to "99" in "V-VOL A" is "11000," the access per capacity of the address from "0" to "99" in "V-VOL A" is "110," the current tier of the address from "0" to "99" in "V-VOL A" is "0," and the destination tier of the address from "0" to "99" in "V-VOL A" is "0."

The tier migration log information 228 includes columns of a log ID 521, date and time 522, IOPS 523, a virtual volume name 541, a virtual volume address 542, and a tier 543. For example, the row 524 and the row 544 show log ID is "5," the address from "0" to "99" in "V-VOL A" was moved to tier "0" at "02/16/2010 06:03 PM," and the amount of access to the storage subsystem 160 at "02/16/2010 06:03 PM" was "7" IOPS (Input Output Operations Per Second). The IOPS is one measure of the performance of the access. Another measure of the performance is BPS (Bits Per Second).

FIG. 6 shows an example of a tier management screen 600 and a restore point selection screen 620. An administrator inputs a tier 601, a media type 602, a capacity threshold 603, and a default tier 604. The tier and media definition information 226 is updated to the data input by the administrator when the administrator pushes an "OK" button 607.

The restore point selection screen 620 includes columns of a restore point 621, date and time 622, and IOPS 623. For example, the row 624 shows the date and time that some addresses are moved to different tier was "02/16/2010 06:03 PM" and the amount of access to the storage subsystem 160 at "02/16/2010 06:03 PM" was "7" IOPS. An administrator selects a restore point and pushes a "restore" button 629.

FIG. 7 shows an example of a read command 700 and a write command 720. The read command 700 includes a command type 701, a volume name 702, and a volume address 703. The read command 700 is sent from the application server 100 to the storage subsystem 160. The write command 720 includes a command type 721, a volume name 722, a volume address 723, and data 724. The write command 720 is sent from the application server 100 to the storage subsystem 160.

Flow of Process

Figure 8:
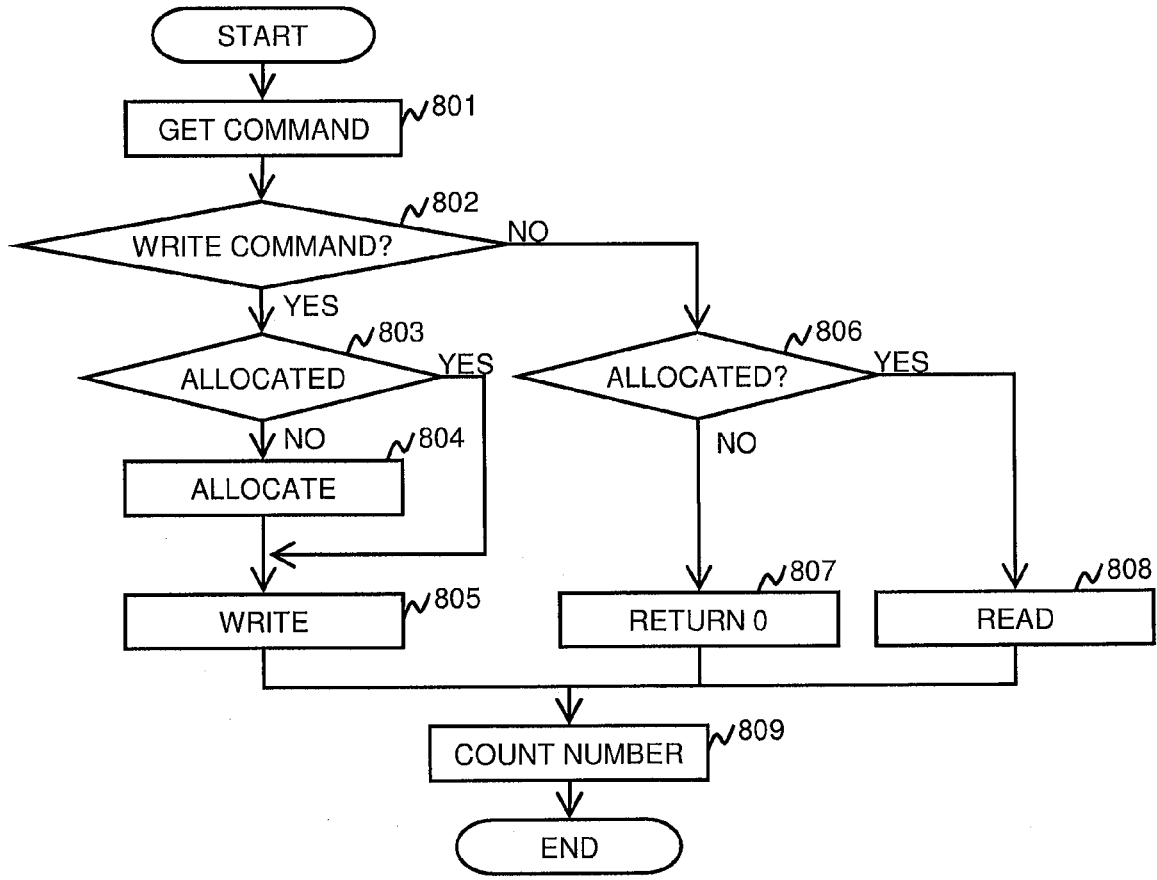
FIG. 8 is an example of a flow diagram showing that the storage subsystem reads data from the SSD and the HDD, and writes data to the SSD and the HDD when the storage subsystem receives the read command or the write command from the application server.

FIG. 8 is an example of a flow diagram showing that the storage subsystem 160 reads data from the SSD 166 and the HDD 167, and writes data to the SSD 166 and the HDD 167 when the storage subsystem 160 receives the read command 700 or the write command 720 from the application server 100.

In step 801, the disk control program 221 receives the read command 700 or the write command 720 from the application server 100. In step 802, if the command that the disk control program 221 received in step 801 is the write command 720, then the process goes to decision step 803; if not, then the process goes to decision step 806.

In decision step 803 (write command), if the volume name 722 and the volume address 723 are allocated in the virtual volume information 225, then the process goes to step 805; if not, then the process goes to step 804. In step 804, the disk control program 221 allocates an area of a logical volume to an unallocated area of a virtual volume. For example, the disk control program 221 selects the media "SATA HDD" for which the default tier 424 is "X" to allocate area. The volume name 722 of the write command 720 is "V-VOL A." According to the pool information 224, "V-VOL A" belongs to "POOL A." "POOL A" comprises "L-VOL A," "L-VOL B," and "L-VOL C." According to the logical volume information 223, the media type 323 of "L-VOL A" is "SSD," the media type 323 of "L-VOL B" is "SAS HDD," and the media type 323 of "L-VOL C" is "SATA HDD." Therefore the disk control 301 program can select "L-VOL C." The disk control program 221 updates the virtual volume information 305 to the result of step 804. In step 805, the disk control program 221 gets the volume name 722 and the volume address 723 from the write command 720, gets the logical volume name 403 and the logical volume address 404 from the virtual volume information 225, gets the RAID group name 324 and the RAID group address 325 from the logical volume information 223, gets the media name 302 from the RAID group information 222, and writes the data 724 to the SSD 166 and the HDD 167.

In decision step 806 (not write command), if the volume name 702 and the volume address 703 are allocated in the virtual volume information 225, then the process goes to step 808; if not, then the process goes to step 807. In step 807, the disk control program 221 returns "0" to the application server 100 because the area specified by the volume name 702 and the volume address 703 is not one to which data is written. In step 808, the disk control program 221 gets the volume name 322 and the volume address 323 from the read command 700, gets the logical volume name 403 and the logical volume address from the virtual volume information 225, gets the RAID group name 324 and the RAID group address 325 from the logical volume information 223, gets the media name 302 from the RAID group information 222, and reads data from the SSD 166 and the HDD 167.

In step 809 (after step 805, 807, or 808), the disk control program 221 increments the number of access 405 by 1, and calculates the access per capacity 406. For example, the virtual volume address 402 is "0-99," and the number of access is "11000" in the row 407. Therefore, the access per capacity 406 in the row 407 is "11000" divided by "100" which is "110."

Figure 9:
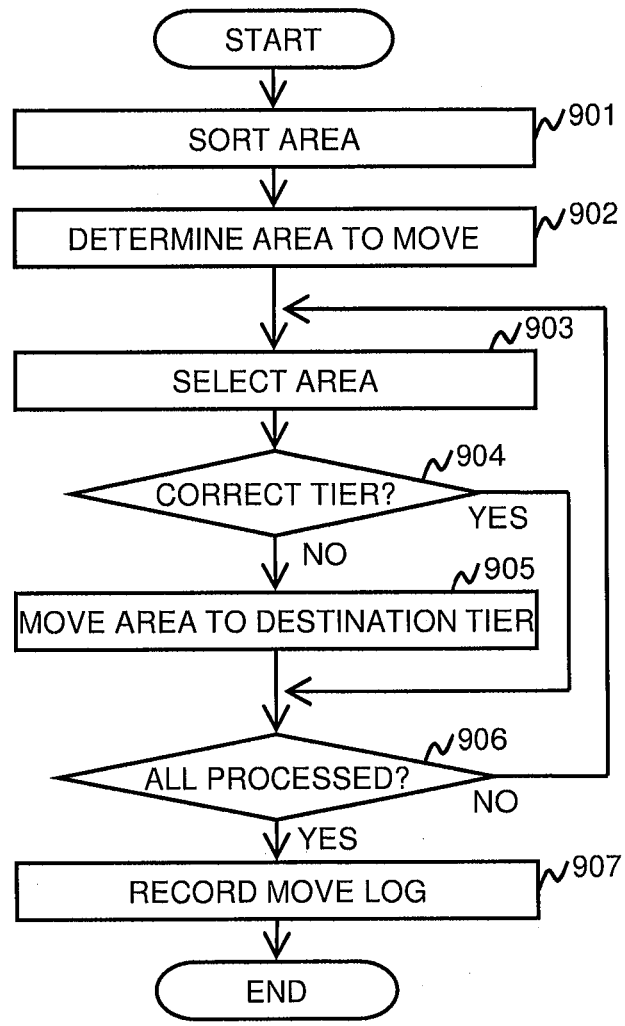
FIG. 9 is an example of a flow diagram showing regularly executed tier migration.

FIG. 9 is an example of a flow diagram showing regularly executed tier migration. For example the flow is executed hourly. In step 901, the tier control program 229 gets the virtual volume information 225 and the media type 323 from the logical volume information 223, makes the tier destination information 227, and sorts the rows in descending order of the number of access 505. In step 902, the tier control program 229 determines which area is moved to a different tier from a logical volume capacity that is calculated from the logical volume address 322 and the capacity threshold 423 from the tier and media definition information 226. For example, the capacity threshold 423 of tier "0" is "80%," the logical volume of tier "0" is "L-VOL A," and the capacity of "L-VOL A" is 200 bytes. Therefore the capacity allocated to tier "0" is 160 bytes. The capacity 503 is 100 bytes in the row 508, the capacity 503 is 50 bytes in the row 509, and the capacity 503 is 50 in the row 510. The sum of the capacity 503 in the row 508 and the capacity 503 in the row 509 is 150; and the sum of the capacity 503 in the row 508, the capacity 503 in the row 509, and the capacity 503 in the row 510 is 200. Therefore, the destination tier 507 of the address from "0" to "99" in "V-VOL A" and the address from "0" to "49" in "V-VOL B" is tier "0."

In step 903, the tier control program 229 selects one row from the tier destination information 227. In judgment step 904, if the current tier 506 obtained at step 903 equals the destination tier 507 obtained at step 903, then the process goes to judgment step 906; if not, then the process goes to step 905. In step 905, the tier control program 229 copies the area selected at step 903 to the destination tier 507 obtained at step 903. For example, the address from "150" to "199" in "V-VOL A" is mapped to the address from "0" to "49" in "L-VOL B," the address from "150" to "199" in "L-VOL A" is not mapped anywhere. Therefore, the tier control program 229 copies data on the address from "0" to "49" in "L-VOL B" to the address from "150" to "199" in "L-VOL A" and updates the virtual volume information 225. In judgment step 906, if all rows in the tier destination information 227 are not processed, then the process goes back to step 903; otherwise, the tier control program 229 records the tier move to the tier migration log information 228 in step 907 and the process ends.

Figure 10:
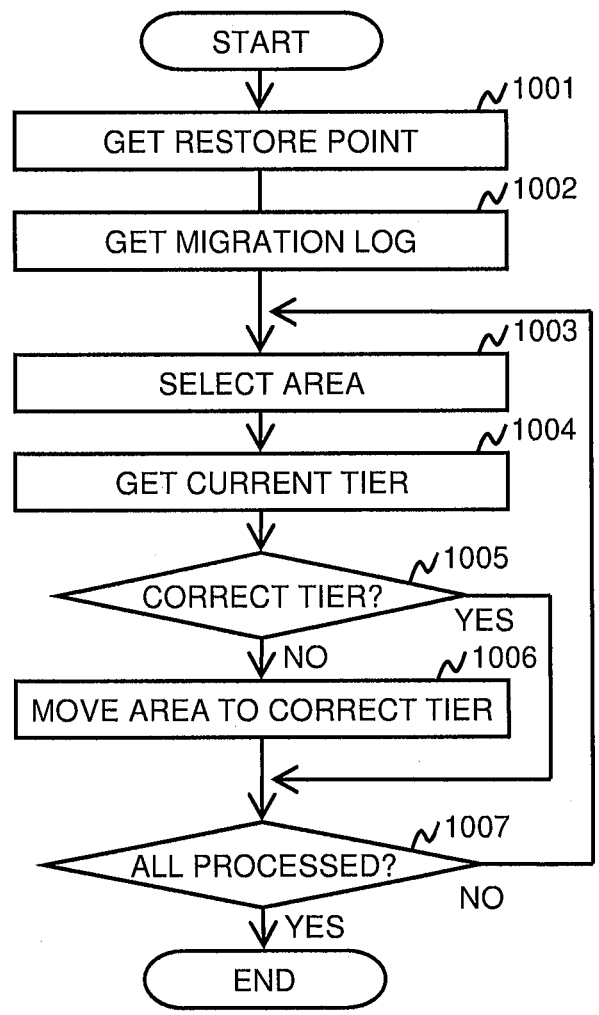
FIG. 10 is an example of a flow diagram showing tier restoration.

FIG. 10 is an example of a flow diagram showing tier restoration. For example the flow is executed hourly. In step 1001, the tier control program 229 gets date and time of a restore point from the restore point selection screen 620. For example, the restore point is selected in the row 624. Therefore the date and time of the restore point is "02/16/2010 06:03 PM." In step 1002, the tier control program 229 gets the tier migration log information 228 that the data and time 522 equals the data and time obtained at step 1001.

In step 1003, the tier control program 229 selects one row from the tier migration log information 228. In step 1004, the tier control program 229 gets current tier of the area selected at step 1003 from the virtual volume information 225, the logical volume information 223, and tier and media definition information 226. For example, when the row 544 is selected at step 1003, the address from "0" to "99" in "V-VOL A" is tier "0."

In step 1005, if the tier 543 obtained at step 1003 equals the tier 421 obtained at step 1004, then the process goes to judgment step 1007; if not, then the process goes to step 1006. In step 1006, the tier control program 229 copies the area selected at step 1003 to the tier 543 obtained at step 903. For example, if the address from "0" to "49" in "V-VOL A" is not placed on tier "0," then the tier control program 229 copies data on the address from "0" to "49" in "V-VOL A" to vacant area on tier "0." In judgment step 1007, if all rows in the tier migration log information 228 are not processed, then the process goes back to step 1003; otherwise, the process ends.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for saving and restoring tier information. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
    a plurality of types of storage devices being configured for forming at least three levels of storage tiers, each of the at least three levels of storage tiers having a plurality of storage areas, a storage area of the plurality of storage areas being allocated to a virtual storage area of a plurality of virtual storage areas of a virtual volume for storing data in accordance with receiving a write command to the virtual storage area;
    a processor being operable to manage log information which includes correspondence between the virtual storage area of the plurality of virtual storage areas and the storage tier of the at least three levels of storage tiers at various points in time, and to allocate the virtual storage area to another storage tier based on a condition of migration whereby data stored to the virtual storage area is migrated from the storage tier to the another storage tier according to a characteristic of the data stored to the virtual storage area, to store the log information for a plurality of restore points corresponding to different levels of storage tiers, and to allocate the storage tier to the virtual storage area based on the log information for restoring the data stored in the virtual storage area to the storage tier allocated to the virtual storage area at one of the restore points selected by a user in a tier restoration to the selected restore point in time; and
    a memory to store tier destination information which includes virtual volume name, virtual volume address, capacity, number of access, access per capacity, current tier, and destination tier, that are organized in a descending order of access per capacity;
    wherein the processor is operable to manage migration of the data stored to the virtual storage area from a current storage tier at a current time to another storage tier at the selected restore point, using the tier destination information and the log information.

2. The storage system according to claim 1, wherein the condition of migration relates to IOPS (Input Output Operations Per Second) or BPS (Bits Per Second).

3. The storage system according to claim 1, further comprising:
    a plurality of virtual volumes; and
    a plurality of logical volumes;
    wherein the processor is operable to set up tier migration log information for the virtual storage area to provide destination storage tier and time information for the virtual storage area, the destination storage tier being determined based on a number of accesses to the virtual storage area, the tier migration log information being updated by inputting the determined destination storage tier and a time; and wherein managing migration of the data stored to the virtual storage area, from the current storage tier at the current time to another storage tier at the selected restore point, includes checking if the current storage tier equals a destination storage tier at the selected restore point specified by the tier migration log information, and if the current storage tier is not equal to the destination storage tier at the selected restore point, then migrating the data stored to the virtual storage area from the current storage tier to the destination storage tier specified by the tier migration log information at the selected restore point.

4. The storage system according to claim 1,
wherein the tier destination information is created based on virtual volume information of the logical volumes and the type of storage devices from logical volume information of the logical volumes, the virtual volume information including virtual volume name, virtual volume address, logical volume name, logical volume address, number of access, and access capacity.

5. The storage system according to claim 4,
wherein the memory stores the virtual volume information and the logical volume information; and
wherein the memory stores tier and media definition information, which includes storage tier, type of storage device, and capacity threshold; and
wherein the current storage tier of the virtual storage area is determined from the virtual volume information, the logical volume information, and the tier and media definition information.

6. The storage system according to claim 3,
wherein the tier migration log information includes log ID, time, and performance corresponding to the log ID and time, and further includes virtual volume name, virtual volume address, and storage tier corresponding to the virtual volume name and virtual volume address.

7. A non-transitory computer-readable storage medium storing a plurality of instructions for controlling a data processor to manage storage tier of data, in a system which includes a host, a network, and a storage system coupled to the host via the network, the storage system having a memory, a plurality of virtual volumes, a plurality of logical volumes, and a plurality of types of storage devices being configured for forming at least three levels of storage tiers, each of the at least three levels of storage tiers having a plurality of storage areas, a storage area of the plurality of storage areas being allocated to a virtual storage area of a plurality of virtual storage areas of a virtual volume for storing data in accordance with receiving a write command to the virtual storage area, the plurality of instructions comprising:

instructions that cause the data processor to manage tier migration log information which includes correspondence between the virtual storage area of the plurality of virtual storage areas and the storage tier of the at least three levels of storage tiers at various points in time, and to allocate the virtual storage area to another storage tier based on a condition of migration whereby data stored to the virtual storage area is migrated from the storage tier to the another storage tier according to a characteristic of the data stored to the virtual storage area;

instructions that cause the data processor to store the log information for a plurality of restore points corresponding to different levels of storage tiers, and to allocate the storage tier to the virtual storage area based on the log information for restoring the data stored in the virtual storage area to the storage tier allocated to the virtual storage area at one of the restore points selected by a user in a tier restoration to the selected restore point in time;

wherein the memory stores tier destination information which includes virtual volume name, virtual volume address, capacity, number of access, access per capacity, current tier, and destination tier, that are organized in a descending order of access per capacity; and instructions that cause the data process or to manage migration of the data stored to the virtual storage area from a current storage tier at a current time to another storage tier at the selected restore point, using the tier destination information and the log information.

8. The non-transitory computer-readable storage medium according to claim 7,
wherein the condition of migration relates to IOPS (Input Output Operations Per Second) or BPS (Bits Per Second).

9. The non-transitory computer-readable storage medium according to claim 7, wherein the plurality of instructions further comprise:
instructions that cause the data processor to set up tier migration log information for the virtual storage area to provide destination storage tier and time information for the virtual storage area, the destination storage tier being determined based on a number of accesses to the virtual storage area, the tier migration log information being updated by inputting the determined destination storage tier and a time;

wherein managing migration of the data stored to the virtual storage area, from the current storage tier at the current time to another storage tier at the selected restore point, includes checking if the current storage tier equals a destination storage tier at the selected restore point specified by the tier migration log information, and if the current storage tier is not equal to the destination storage tier at the selected restore point, then migrating the data stored to the virtual storage area from the current storage tier to the destination storage tier specified by the tier migration log information at the selected restore point.

10. The non-transitory computer-readable storage medium according to claim 7,
wherein the plurality of instructions further comprise instructions that cause the data processor to create the tier destination information based on virtual volume information of the logical volumes and the type of storage devices from logical volume information of the logical volumes, the virtual volume information including virtual volume name, virtual volume address, logical volume name, logical volume address, number of access, and access capacity.

11. The non-transitory computer-readable storage medium according to claim 10,
wherein the memory stores the virtual volume information and the logical volume information; and
wherein the memory stores tier and media definition information, which includes storage tier, type of storage device, and capacity threshold; and
wherein the plurality of instructions further comprise instructions that cause the data processor to determine the current storage tier of the virtual storage area from the virtual volume information, the logical volume information, and the tier and media definition information.

12. The non-transitory computer-readable storage medium according to claim 9,
wherein the tier migration log information includes log ID, time, and performance corresponding to the log ID and time, and further includes virtual volume name, virtual volume address, and storage tier corresponding to the virtual volume name and virtual volume address.

13. A method of storage tier management of data, in a system which includes a host, a network, and a storage system coupled to the host via the network, the storage system having a memory, a plurality of virtual volumes, a plurality of logical volumes, and a plurality of types of storage devices being configured for forming at least three levels of storage tiers, each of the at least three levels of storage tiers having a plurality of storage areas, a storage area of the plurality of storage areas being allocated to a virtual storage area of a plurality of virtual storage areas of a virtual volume for storing data in accordance with receiving a write command to the virtual storage area, the method comprising:
managing log information which includes correspondence between the virtual storage area of the plurality of virtual storage areas and the storage tier of the at least three levels of storage tiers at various points in time;
allocating the virtual storage area to another storage tier based on a condition of migration whereby data stored to the virtual storage area is migrated from the storage tier to the another storage tier according to a characteristic of the data stored to the virtual storage area;
storing the log information for a plurality of restore points corresponding to different levels of storage tiers;
allocating the storage tier to the virtual storage area based on the log information for restoring the data stored in the virtual storage area to the storage tier allocated to the virtual storage area at one of the restore points selected by a user as a tier restoration to the selected restore point in time;
storing in the memory tier destination information which includes virtual volume name, virtual volume address, capacity, number of access, access per capacity, current tier, and destination tier, that are organized in a descending order of access per capacity; and
managing migration of the data stored to the virtual storage area from a current storage tier at a current time to another storage tier at the selected restore point, using the tier destination information and the log information.

14. The method according to claim 13,
wherein the condition of migration relates to IOPS (Input Output Operations Per Second) or BPS (Bits Per Second).

15. The method according to claim 13, further comprising:
setting up tier migration log information for the virtual storage area to provide destination storage tier and time information for the virtual storage area, the destination storage tier being determined based on a number of accesses to the virtual storage area, the tier migration log information being updated by inputting the determined destination storage tier and a time;
wherein managing migration of the data stored to the virtual storage area, from the current storage tier at the current time to another storage tier at the selected restore point, includes checking if the current storage tier equals a destination storage tier at the selected restore point specified by the tier migration log information, and if the current storage tier is not equal to the destination storage tier at the selected restore point, then migrating the data stored to the virtual storage area from the current storage tier to the destination storage tier specified by the tier migration log information at the selected restore point.

16. The method according to claim 13,
wherein the tier destination information is created based on virtual volume information of the logical volumes and the type of storage devices from logical volume information of the logical volumes, the virtual volume information including virtual volume name, virtual volume address, logical volume name, logical volume address, number of access, and access capacity.

17. The method according to claim 16,
wherein the memory stores the virtual volume information and the logical volume information; and
wherein the memory stores tier and media definition information, which includes storage tier, type of storage device, and capacity threshold; and
wherein the current storage tier of the virtual storage area is determined from the virtual volume information, the logical volume information, and the tier and media definition information.

* * * * *